(12) United States Patent
Russell (10) Patent No.: US 11,356,550 B1
(45) Date of Patent: Jun. 7, 2022

(54) SYSTEMS AND METHODS FOR DETERMINING THE DRIVER OF A VEHICLE

(71) Applicant: UIPCO, LLC, San Antonio, TX (US)

(72) Inventor: Christopher M. Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 3 days.

(21) Appl. No.: 17/069,962

(22) Filed: Oct. 14, 2020

Related U.S. Application Data (63) Continuation of application No. 16/694,219, filed on Nov. 25, 2019, now Pat. No. 10,863,020.

(60) Provisional application No. 62/868,014, filed on Jun. 28, 2019.

(51) Int. Cl.
| | |
|---|---|
| *H04M 1/72463* | (2021.01) |
| *B60K 35/00* | (2006.01) |
| *B60W 40/08* | (2012.01) |
| *G06F 3/04817* | (2022.01) |
| *G06F 3/14* | (2006.01) |
| *G06F 13/10* | (2006.01) |
| *H04W 48/04* | (2009.01) |
| *G06F 1/16* | (2006.01) |

(52) U.S. Cl.
CPC ......... *H04M 1/72463* (2021.01); *B60K 35/00* (2013.01); *B60W 40/08* (2013.01); *G06F 3/04817* (2013.01); *G06F 3/1423* (2013.01); *G06F 13/102* (2013.01); *H04W 48/04* (2013.01); *B60K 2370/197* (2019.05); *B60W 2040/0881* (2013.01); *G06F 1/1626* (2013.01)

(58) Field of Classification Search
CPC ............... H04M 1/72463; B60K 35/00; B60K 2370/197; G06F 3/04817; G06F 13/102; G06F 3/1423; G06F 1/1626; H04W 48/04; B60W 40/08; B60W 2040/0881
USPC ............. 455/41.1–41.2, 404.2, 414.1–414.2, 455/418–420, 456.1–457
See application file for complete search history.

(56) References Cited

U.S. PATENT DOCUMENTS

| | | | |
|---|---|---|---|
| 2004/0192331 A1* | 9/2004 | Gorday | H04W 4/14 455/456.1 |
| 2013/0035117 A1* | 2/2013 | Litkouhi | H04W 4/48 455/456.4 |
| 2014/0240089 A1* | 8/2014 | Chang | G06Q 20/3223 340/5.61 |
| 2015/0148019 A1* | 5/2015 | Michaelis | H04M 1/72463 455/418 |
| 2016/0316319 A1* | 10/2016 | Craine | H04W 4/48 |
| 2017/0353597 A1* | 12/2017 | Wolterman | H04W 4/48 |

* cited by examiner

*Primary Examiner* — Michael Y Mapa
(74) *Attorney, Agent, or Firm* — Plumsea Law Group, LLC (57) ABSTRACT

A system and method for disabling distracting apps on a driver's personal devices while allowing passengers travelling in the same vehicle to have full use of their personal devices. The system works by first identifying all the personal devices that are in the vehicle and then establishing a loose mesh network between those devices. Once the mesh network is established, the system identifies which of the personal devices is associated with the driver, and ensures that any distracting apps on the driver's personal device are disabled, while allowing full functionality for any passenger's personal devices.

13 Claims, 9 Drawing Sheets

SYSTEMS AND METHODS FOR DETERMINING THE DRIVER OF A VEHICLE

CROSS-REFERENCE TO RELATED APPLICATIONS

This application is a continuation of U.S. patent application Ser. No. 16/694,219, filed Nov. 25, 2019, for "Systems and Methods For Determining The Driver Of A Vehicle," which application claims the benefit of U.S. Provisional Patent Application Ser. No. 62/868,014, filed Jun. 28, 2019, for "Systems and Methods For Determining The Driver Of A Vehicle," both of which are incorporated by reference herein in their entireties.

TECHNICAL FIELD

This disclosure relates generally to systems and methods for enhancing safety in motor vehicles by disabling distracting apps on the personal devices associated with the driver of the vehicle.

BACKGROUND

It is now well understood that a significant number of vehicle accidents occur while drivers are distracted by their personal devices, such as smartphones, tablets and laptops. Despite many warnings and public service announcements alerting drivers of the risks they are taking by responding to or making telephone calls, reading or sending text messages, or reading communications received via any of the several social media platforms, accidents due to such distracted driving continue to happen at an alarming rate. One possible solution to this issue—disabling all personal devices in a vehicle once the vehicle is in motion—is unsatisfactory because disabling the personal devices of passengers serves no useful purpose. Even less drastic measures, such as precluding making phone calls based upon GPS position may be unsatisfactory because they do not preclude a personal device from being used for texting or accessing social media, for example.

Instead, in many cases, allowing passengers (but not drivers) to entertain themselves during a long drive makes the trip more pleasurable (or at least more tolerable) for both the driver and the passengers. Also, drivers often may need to use certain apps while they are driving that are sufficiently useful such that their usefulness outweighs any slight increase in the risk posed by any distraction caused by the apps. Examples of such apps include a hands-free app for receiving telephone calls and a navigation app.

For these reasons, there is a need for systems and methods that limit drivers' uses of their personal devices, but allow passengers full use of their personal devices.

SUMMARY

In one aspect, embodiments include a method for reducing distractions for the driver of a motor vehicle by having a first personal device broadcast pings that include a time stamp identifying when the pings were sent. A second personal device receives the pings, calculates that it is probably collocated with the first personal device, and responds by reporting its position and velocity relative to the first personal device, and the time it received the ping from the first device. The first personal device then determines that the second personal device is proximal to the first personal device and establishes a mesh network with the second personal device. The first personal device and the second personal device then exchange identification of any additional personal devices that might have previously been identified by either of the two devices, eliminate any duplicates, and add the de-duplicated devices to the mesh network. The method then identifies which of the personal devices are associated with the driver of the motor vehicle, and which are associated with passengers, and disables all distracting apps from the driver's personal devices.

In another aspect, embodiments include a method for reducing distractions for a driver of a motor vehicle using a first personal device broadcasting pings that include a time stamp identifying the time when the pings were sent, and a second personal device that receives the pings broadcast by the first personal device. The second personal device then calculates the distance from the first personal device to the second personal device based at least in part on the time the pings were received compared to the time identified in the time stamp. The first personal device and the second personal device establish a mesh network between them, and further determine whether any additional personal devices are collocated with the first personal device and the second personal device. The first personal device and the second personal device then add any additional personal devices that have been determined to be collocated with the first personal device and the second personal device within the motor vehicle to the mesh network, identify any personal devices that are associated with the driver of the vehicle, and disable any distracting apps present in the personal devices associated with the driver of the motor vehicle.

In yet another aspect, embodiments include a method for reducing distractions for a driver of a motor vehicle in which a first personal device broadcasts pings that include time stamps identifying when the pings were sent. A second personal device receives the pings broadcast by the first personal device at specific receiving times, and calculates its position relative to the first personal device based upon differences between the times identified by the time stamps and the specific receiving times. The first personal device then determines that the second personal device is collocated with the first personal device within the motor vehicle, and establishes a mesh network between the first personal device and the second personal device. The first personal device and the second personal device then identify any additional personal devices that may be collocated within the vehicle, identify which of the personal devices are associated with the driver of the vehicle, and disable any distracting apps on the personal devices associated with the driver of the vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems and methods for disabling certain functions on a driver's personal devices while allowing passengers travelling in the same vehicle to have full use of their personal devices.

As used herein, the term "personal device" shall cover all kinds of smart communications and/or computer devices such as smartphones, tablets and personal computers (including notebook computers, laptop computers and desktop computers). Also, the term "distracting app(s)" shall refer to apps on a personal device that are more distracting than listening to a radio at a normal volume or chatting with a passenger.

The systems work by first identifying all the personal devices that are in the vehicle. The basis for this identification is the proximity of each personal device to the other personal devices, as well as the velocity and direction of the motions of the personal devices. Once the personal devices that are determined to be collocated within the vehicle (based upon the criteria described in more detail below) have been identified, the system establishes a loose mesh network among the devices. In some embodiments, the mesh network may use a wireless technology such as Bluetooth to determine whether personal devices are collocated, or to implement communications between personal devices. In other embodiments, the personal devices may use other wireless technologies.

In some cases, the location of the personal devices may be determined using acoustic waves. For example, the time information may be sent wirelessly, and the distance may be determined based upon the time delay in receiving an acoustic ping. In some cases, the mesh network may also include one or all of the vehicle's own systems such as units that report the vehicle configuration or monitoring units that monitor seat belt usage, passenger seat occupation, vehicle location based on GPS coordinates, whether headlights or windshield wipers are turned on, and whether the vehicle's doors are opened or closed, for example. In other cases, the mesh network may simply be in communication with the vehicle's configuration or monitoring units so that it can receive information (such as the vehicle's configuration, velocity, direction and location) from these systems, without including them in the mesh network.

After the loose mesh network of the personal devices in the vehicle has been established, the system determines which of the personal devices is associated with the driver of the vehicle, and which ones are associated with any of the passengers travelling in the vehicle. Based upon the vehicle's size and configuration, input from the vehicle's own monitoring units, in-vehicle video camera, and/or geographical location, the system may assume that the driver is in the left front seat (the U.S. and many other countries) or in the right front seat (the U.K. and some other countries). The system may then disable certain functionalities in the driver's one or more personal devices, while allowing full functionality for the passengers' personal devices. For example, the system may allow the driver to receive incoming telephone calls if the vehicle allows hands-free telephone communications and may also allow outgoing phone calls if those can be made using only voice commands. It may also allow the operation of navigation apps on the driver's personal devices, for example. However, it would not allow the driver's personal devices to be used for any applications that would be more distracting than, for example, listening to a radio or chatting with a passenger.

In some cases, the default condition is for the apps to be disabled when the car engine is started. In these cases, the system would enable those apps for the passengers, while leaving the driver's distracting apps disabled. In other cases, the default condition is for the apps to remain enabled when the car engine is started. In those cases, distracting apps on the driver's personal devices would be disabled immediately after the engine is started.

With these embodiments, the apps on the passengers' personal devices would not be disabled in any way such that the passengers would have full use of their personal devices, so that they could watch videos or listen to music, possibly play video games with friends, or use social media.

In a further embodiment, the system may determine that the vehicle has been in an accident. For example, if most or all of the various personal devices in the vehicle suddenly change their positions—for example if they all appear to have been thrown towards the front of the vehicle—the system may conclude that an accident may have occurred. In that case, the system could alert first responders as to the possibility of an accident. The system may also report the identity of the person who was driving the vehicle at the time of the accident.

Figure 1:
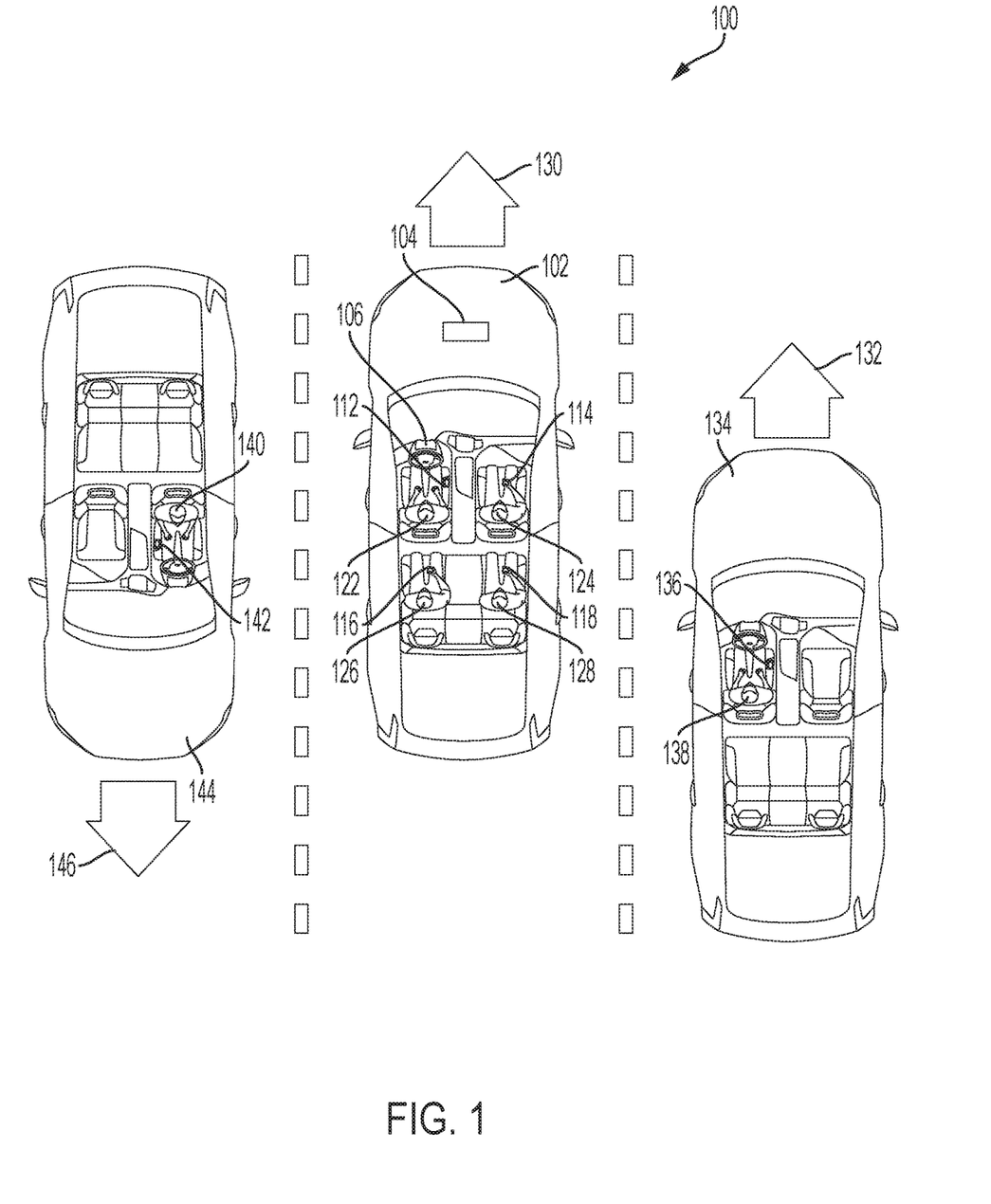
FIG. 1 is an exemplary illustration showing an automobile carrying a driver and passengers in traffic.

FIG. 1 is a schematic illustration 100 showing a vehicle 102 travelling in the direction indicated by arrow 130. Vehicle 102 has four occupants, including a driver 122 behind a steering wheel 106, a front seat passenger 124, a left rear seat passenger 126 and a right rear seat passenger 128. A personal device 112 is positioned to the right of driver 122. Passenger 124 is holding a personal device 114; passenger 126 is holding a personal device 116; and passenger 128 is holding a personal device 118.

Vehicle monitoring and communications systems 104 may include units that monitor the status of the vehicle such as whether the drivers and/or passengers are occupying their seats, whether safety belts are being used, and whether the doors are opened or closed. They may also monitor the speed, travel direction and location of the vehicle. Systems 104 may also contain information regarding the configuration of the vehicle, such as whether its steering wheel is on the left side or right side of the vehicle.

In the exemplary illustration shown in FIG. 1, vehicle 102 is travelling in the left-hand lane in the direction indicated by arrow 130. It has a second vehicle 134 to its right, travelling in the same direction as vehicle 104, as indicated by arrow 132. Vehicle 134 has a driver 138, who has a personal device 136 positioned nearby. Vehicle 144 is to the left of vehicle 104, travelling in the opposite direction as shown by arrow 146. Vehicle 144 has a driver 140, who has a personal device 142 positioned nearby. Thus, in this example, the system needs to determine which of device 112, device 114, device 116, device 118, device 136 and device 142 are collocated within vehicle 102 and therefore need to be included in the mesh network, and which are not, and therefore need to be excluded from the mesh network.

Figure 2:
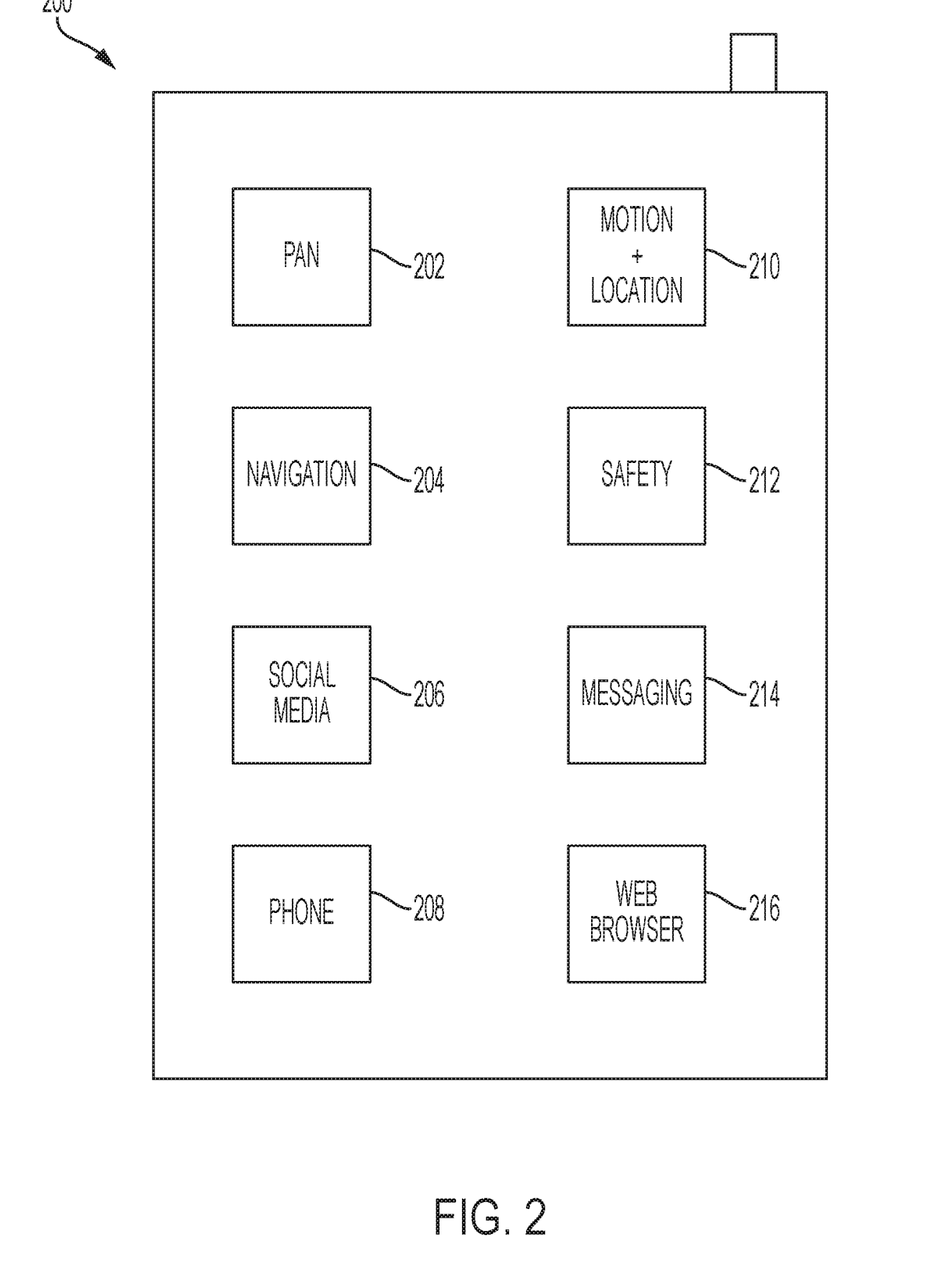
FIG. 2 is a schematic diagram of an embodiment of a typical personal device such as a smartphone showing examples of applications that may be installed on the device.

FIG. 2 is a schematic diagram of an exemplary personal device that includes a personal area network (PAN) app 202, a navigation app 204, a social media app 206, a phone app 208, a motion and location app 210, a safety/security app 212, a messaging app 214 and a web browser 216. In most cases, safety may be improved by disabling social media app 206, messaging app 214 and the web browser 216 on the driver's personal device 112, while allowing full operation of PAN app 202, navigation app 204, safety/security app 212 and motion and location app 210 on the driver's personal device 112. If the driver's personal device 112 allows hands-free phone operation, phone app 208 on the driver's personal device 112 may allow calls to be received but not initiated, or may allow both incoming and outgoing functionality. The passengers' personal devices, including personal device 114, personal device 116 and personal device 118, would retain their full functionality.

Figure 3:
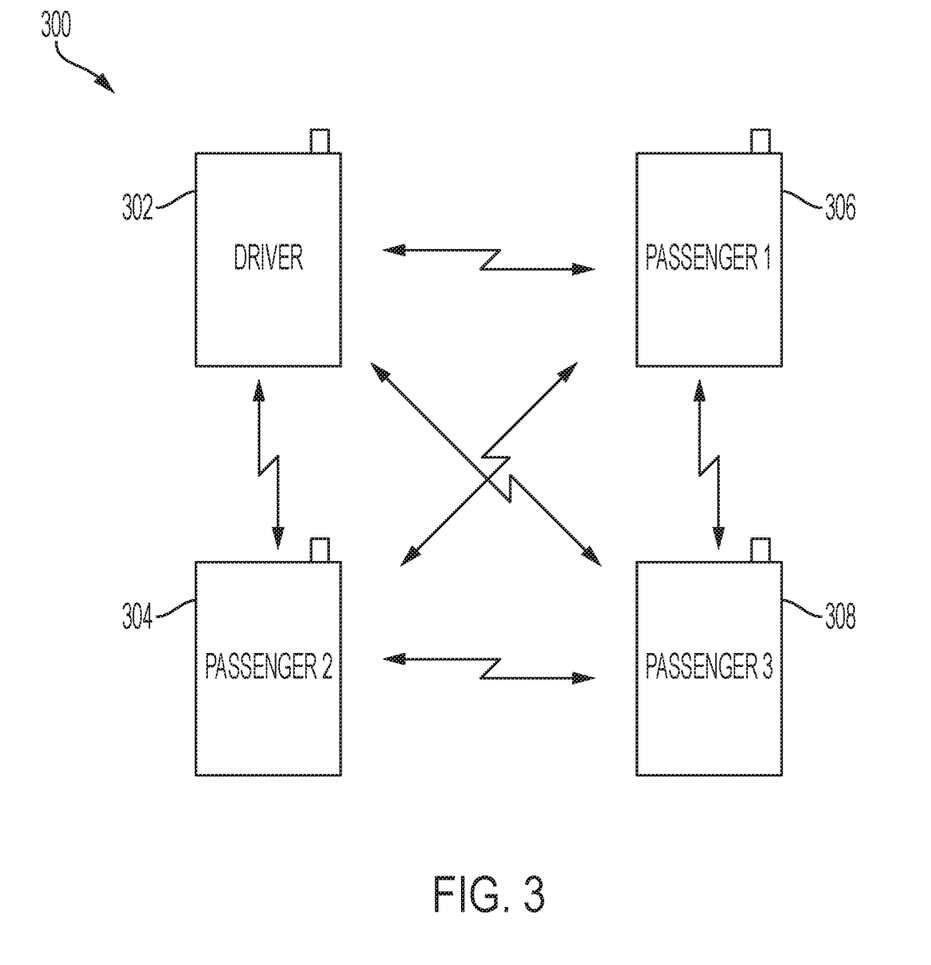
FIG. 3 is an exemplary illustration of a mesh network that may be established between the personal devices shown in FIG. 1, in an embodiment.

FIG. 3 is a schematic block diagram showing an example of the kind of loose mesh network that needs to be established in vehicle 102, shown in FIG. 1. When the mesh network is established, the driver's personal device 302 will be in communication with each of passenger 1's personal device 306, passenger 2's personal device 304 and passenger 3's personal device 308, as indicated by the jagged arrows in FIG. 3. It should be noted, however, that although FIG. 1 and FIG. 3 show the driver as having just one personal device, the driver may have more than one personal device. In that case, the descriptions of the functionality of the driver's personal device set forth herein would be applicable to all of the driver's personal devices. Each of the passengers' personal devices would also be in wireless communication with all the other personal devices that have been collocated in the vehicle, including the driver's device(s) and the other passengers' personal devices, as indicated by the jagged arrows in FIG. 3.

The first step in establishing the loose mesh network in vehicle 102 is to identify those personal devices that are actually in vehicle 102 and distinguish those personal devices that are in the general proximity of vehicle 102 without actually being within vehicle 102. FIG. 1 shows two such examples. Personal device 142 is in vehicle 144 which is travelling in the direction shown by arrow 146, which is opposite to the travel direction of vehicle 102. If at least one of vehicle 102 and vehicle 144 is moving, then personal device 142 can be quickly eliminated as being possibly collocated within vehicle 102 because vehicle 144 will not be proximal to vehicle 102 for more than a very brief time. If both vehicles are stationary, personal device 142 may be eliminated based upon its distance from the other personal devices using, for example, the pinging technique described below with reference to FIG. 4, or based upon the relative signal strength of the ping received from personal device 142 compared to the signal strength of pings received from the other devices. Device 142 may also be eliminated simply by waiting until one of the vehicles starts moving.

Distinguishing devices located in adjoining vehicles travelling in the same direction is somewhat more difficult. For example, if vehicle 134 is travelling in the direction shown by arrow 132 is travelling at the same speed as vehicle 102, device 136 would not be quickly eliminated based simply on relative motion. For example, if both vehicle 102 and vehicle 134 were on cruise control, with the cruise control set to the speed limit, personal device 136 would be travelling at the same speed in the same direction and have roughly the same location as the personal devices in vehicle 102. In most cases, however, this rough location similarity would not last very long as the drivers shift lanes, speed up or slow down, for example, and personal device 136 could be eliminated from inclusion the mesh network for this reason alone.

Furthermore, personal devices such as personal device 136 may be eliminated from inclusion in the mesh network by (1) measuring the distance between the various personal devices under consideration for inclusion in the mesh network, and/or (2) comparing the relative signal strength of the pings received from the various personal devices under consideration for inclusion in the mesh network. The distances between any two devices may be estimated by sending pings from a sending device to a receiving device, with a time stamp identifying the precise time the ping was sent. The receiving device could then calculate the distance between the sending device and the receiving device based on the delay in receiving the ping. Also, the signal strength of the ping from personal device 136 received at, for example, personal device 112, is likely to be much lower than the signal strength of pings received at personal device 112 from personal device 114, for example, simply because personal device 114 is indeed much closer to personal device 112 than is personal device 136. Also, the ping from personal device 136 may be further attenuated by physical barriers between the personal devices. Thus, personal device 136 in vehicle 134 may be identified as not being collocated, compared to the locations of personal device 112, personal device 114, personal device 116 and personal device 118 based upon distance and signal strength.

The system may also use information received from the vehicle's monitoring units. For example, if the vehicle reports that four seats are occupied and four seatbelts are in use, and the system had only identified three personal devices, it may search a little longer for a fourth collocated personal device before concluding that there are only three personal devices in the vehicle.

Figure 4:
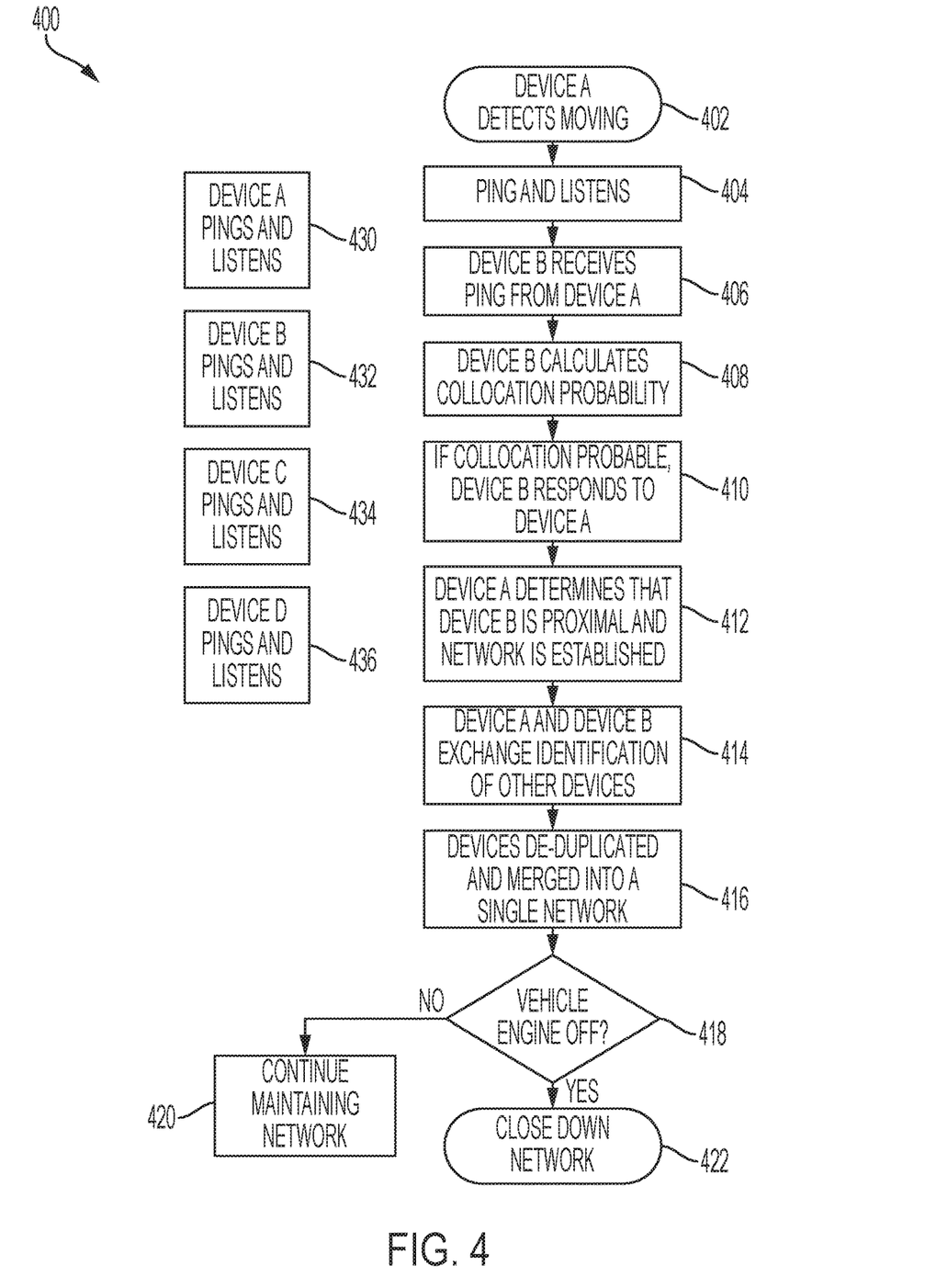
FIG. 4 is an exemplary flowchart showing how a mesh network may be established between the devices shown in FIG. 1, in an embodiment.

FIG. 4 shows an exemplary flowchart 400 that may be used to establish a loose mesh network that includes all the personal devices within a given vehicle, such as Device A which is listening in resting step 430, Device B which is listening in resting step 432, personal device C which is listening in resting step 434 and personal device D which is listening in resting step 436, as shown schematically on the left side of FIG. 4. Then, in step 402 one of the four personal devices, referred to in flowchart 400 as Device A and which had been resting until that instant, determines that the vehicle is moving at a velocity which is greater than any velocity that typical human beings would normally be capable of attaining when walking or running. This velocity will be referred-to herein as a threshold velocity. For example, the threshold velocity may be 8 mph, 10 mph or 12 mph. Device A then broadcasts pings in step 404 and listens to determine if there are any possible collocated personal devices. The pings include a time stamp identifying the time the ping was sent, as well as specifying the location, direction of travel and velocity of travel of Device A. The pings sent out by the personal devices in the embodiments described above may be wireless pings, but they may also be other types of pings, such as acoustic pings, for example.

In step 406, another device in the vehicle, for example Device B, receives the ping from Device A, and calculates the collocation probability in step 408 based upon the criteria described briefly above and in greater detail below. If device B determines that collocation is probable, for example by calculating that the probability of collocation exceeds a certain threshold (such as 75%, 85%, 90% or greater), Device B responds to Device A in step 410 with a ping of its own back to Device A with, for example, its position relative to Device A, the velocity of Device B relative to Device A, and the time it received the ping sent by Device A, for example.

In step 412, Device A then determines that Device B is proximal to Device A and establishes a loose network of collocated devices with Device B. In step 414 Device A and Device B exchange identification of other devices either of them might have identified as being probably within the same vehicle. In step 416 any duplicates are eliminated, and the identified and de-duplicated personal devices are merged into a single network. In step 418 the system checks to determine if the vehicle engine has been turned off. If the vehicle engine is still running, in step 420 the system continues maintaining the loose mesh network (generally after a time delay) by possibly adding personal devices to the network as described below with reference to FIG. 5 or by possibly removing devices as described below with reference to FIG. 6. If the vehicle engine has been turned off, the system closes down the network in step 422.

In this example, for convenience, Device A may be referred to as the primary personal device and Device B and any additional personal devices may be referred-to as secondary personal devices.

The determination of whether collocation is probable in step 408 may be made based on criteria such as (a) the time to receive a ping, since pings that are outside a specific time frame are likely too far to be in the same vehicle; (b) the relative velocity of Device B with respect to Device A, since if the two devices are travelling at different velocities they could not be in the same vehicle; (c) sending a secondary validation ping to determine if the relative positions of the two devices may have changed, since that would also indicate that they are in different vehicles; (d) the signal strength, as discussed above; and (e) the number of relatively identical pings, since if Device A continues to send pings and Device B continues to receive those pings, the two devices are likely to be collocated.

As noted above, the system may also use information received from the vehicle's monitoring units in making its determination of collocation. For example, in some embodiments the vehicle's monitoring unit may provide the vehicle's velocity to the personal devices, and only those devices that are moving at the same velocity as the vehicle (the velocity may be averaged over several seconds) would be included in the mesh network.

Figure 5:
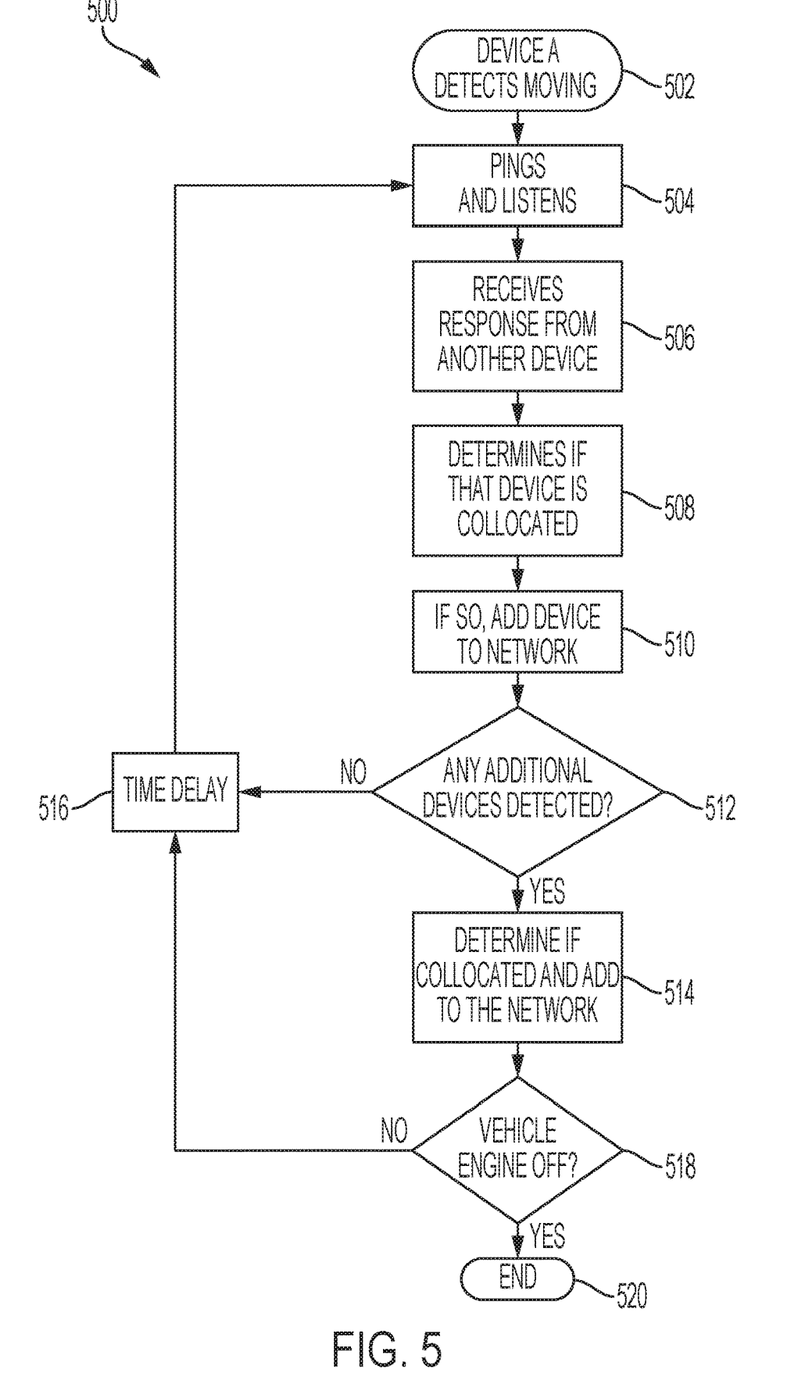
FIG. 5 is an exemplary flowchart showing how the additional devices may be added to the mesh network if collocated, in an embodiment.

Personal devices may be added to the loose mesh network as shown in the exemplary flowchart 500 in FIG. 5. For example, in some cases a personal device that may have been turned off when the vehicle started moving may be turned on at a later time during the trip. In other cases, the vehicle may stop and a new passenger with another personal device may enter the vehicle. Thus the process starts in step 502, when Device A, for example, determines that the vehicle is moving, and pings and listens in step 504. In step 506, Device A determines that it has received a responsive ping from a new personal device, i.e., a personal device that had not been part of the loose mesh network until then. The system then determines whether that new personal device is collocated with the personal devices that are already on the loose mesh network in step 508 using the methodology described above with respect to step 408 in FIG. 4. If the new personal device is collocated, it is added to the loose mesh network in step 510.

The system then checks to see if it can detect any additional new personal devices in step 512. If it does not detect any other new personal devices, the system proceeds to a time delay in step 516 and then returns to step 504. If it does detect another additional device, it then determines if that additional device is also collocated, and adds the additional device to the network in step 514. In step 518 the system checks to see if the vehicle engine has been turned off. If the engine is off, the process ends in step 520. If the engine is still running, the process proceeds to the time delay in step 516 and then starts again by pinging and listening in step 504.

Figure 6:
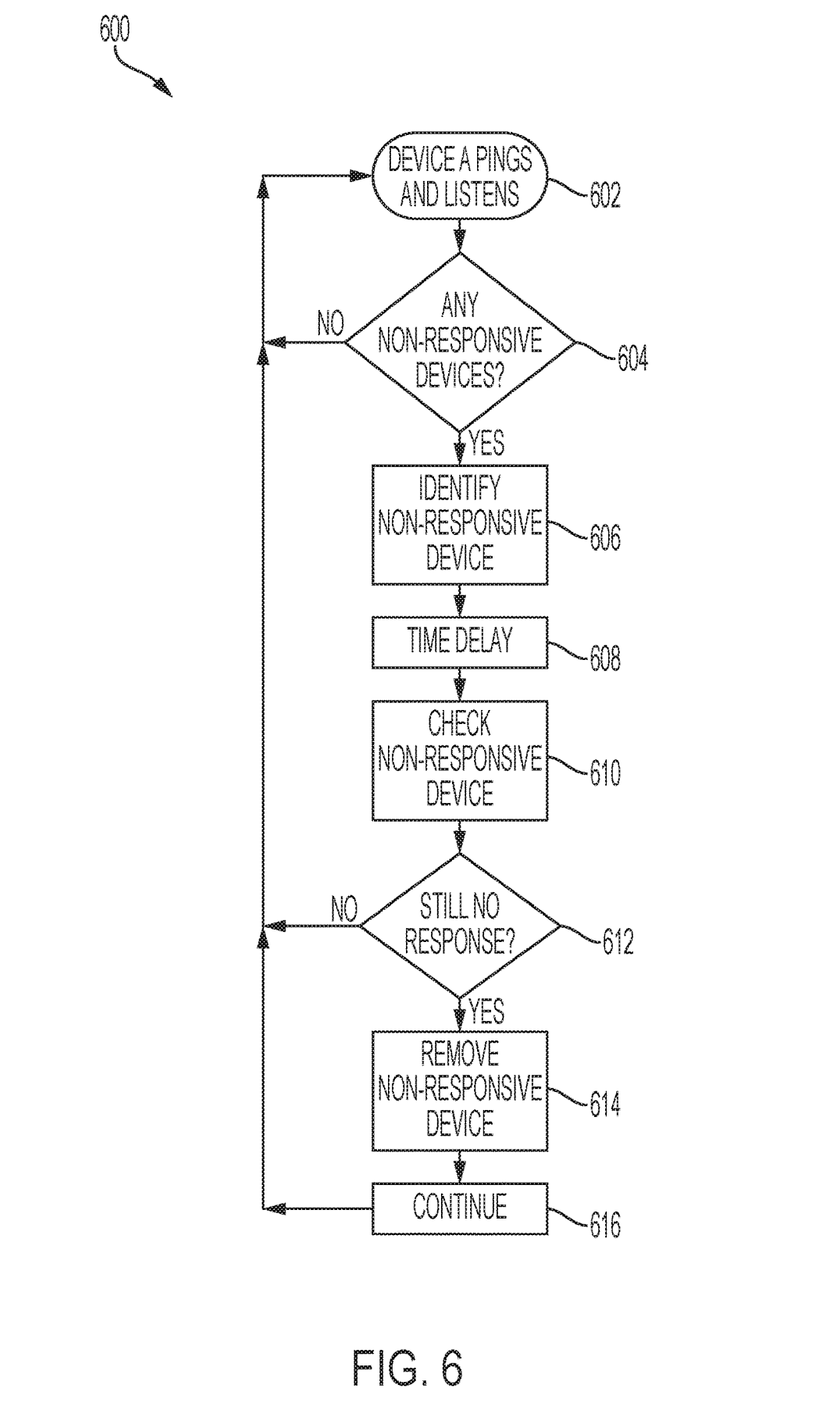
FIG. 6 is an exemplary flowchart showing how a non-responsive device may be detected and removed from the mesh network, in an embodiment.

Personal devices that have left the network can be removed according to, for example, flowchart 600 shown in FIG. 6. In step 602, one of the devices on the loose mesh network issues a series of pings to the other devices on the network. For example, Device A may issue these pings, but it could be any of the other personal devices on the loose mesh network. In step 604, this device determines whether any of the personal devices on its list of personal devices on the mesh network is no longer responding to its pings. If all the devices on the mesh network respond to its pings, the device returns to step 602 to continue the process. In some embodiments, it does so after a time delay. If one or more of the personal devices on the loose mesh network is not responsive, the device identifies the non-responsive devices in step 606. After a time delay in step 608, the device checks again to confirm whether the missing device is still non-responsive in step 610. If the device still does not receive a response in step 612, the device then removes the non-responsive device from the loose mesh network in step 614. The process then continues in step 616, and returns to step 602 to start checking again. The loop from step 616 up to step 602 may include a time delay, for example a 100 second delay, to relieve the burden on the mesh network.

Even without an event such as the vehicle stopping and a door being opened, one or more of the devices may perform a periodic audit of the mesh network to make sure that all previously identified personal devices are still in communication with the mesh network and that no additional devices have started operating within the vehicle.

Once the loose mesh network has been established according to, for example, the process shown in FIG. 4, the system proceeds to identify which of the personal devices is associated with the driver of the vehicle. It does so in order that it can ensure that certain distracting apps in the driver's personal device are disabled, while allowing full functionality to all the other personal devices in the vehicle. For example, if applied to vehicle 102 in FIG. 1, the system would proceed to determine which of the personal devices is personal device 112 which is associated with the driver 122, so that it can ensure that the distracting apps in personal device 112 are disabled, without having to disable any functionalities of personal device 114, personal device 116 or personal device 118.

Figure 7:
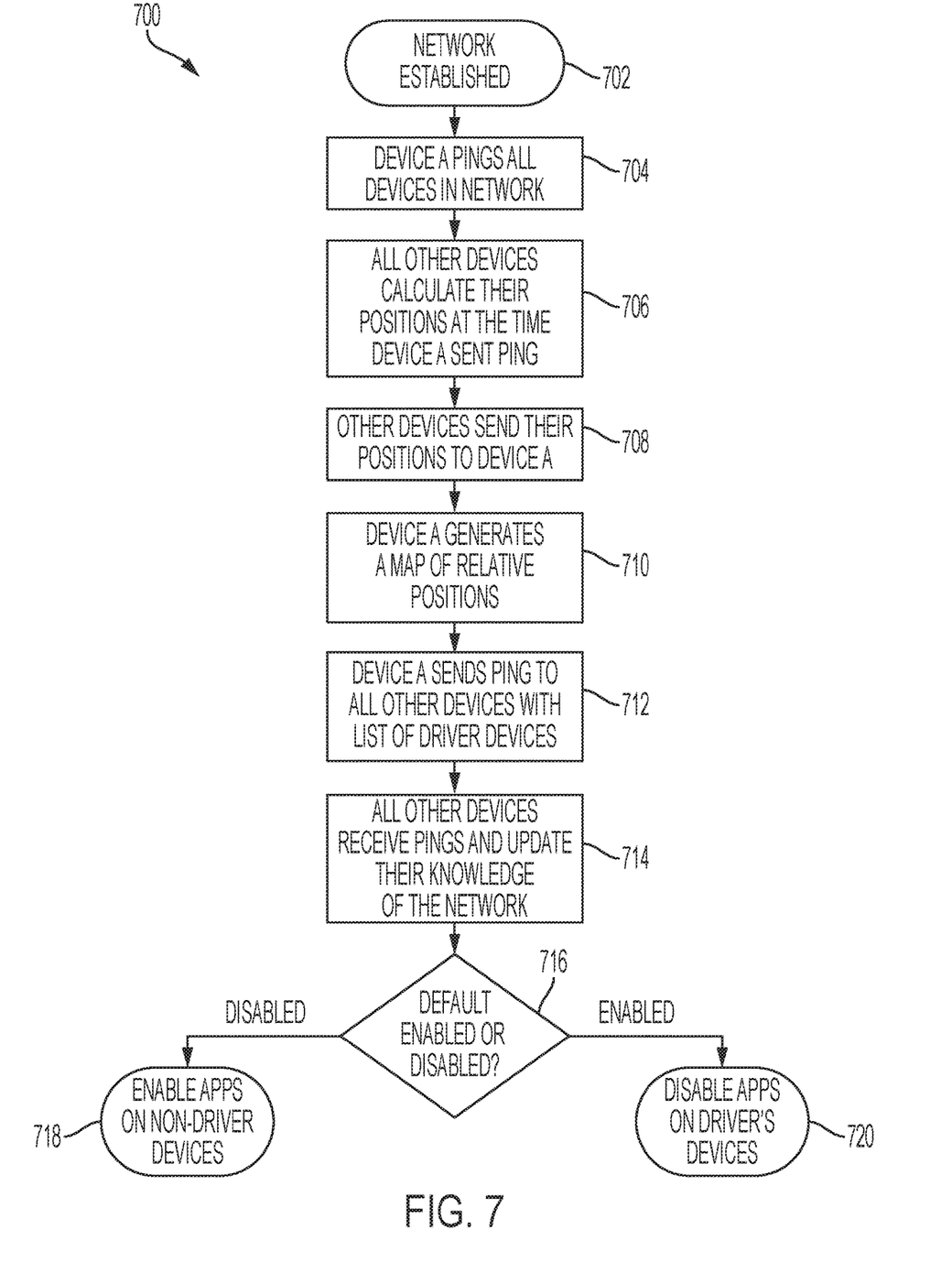
FIG. 7 is an exemplary flowchart showing how a driver's device may be identified, in an embodiment.

As shown in the embodiment illustrated in flowchart 700 shown in FIG. 7, the process starts in step 702 when the loose mesh network is established. In step 704 one of the personal devices—denoted as Device A in FIG. 7—pings all the other personal devices on the loose mesh network, and in step 706 the other personal devices calculate their relative positions at the time Device A sent the ping out based on the delay between when the ping was emitted and when it was received by the other personal devices. In step 708 the other devices send their relative positions back to Device A. Device A may also use, for example, information received from the vehicle units (such as the position of the driver, passenger seat occupation and seat belt usage, for example), the direction of travel and the velocity of the vehicle, and any local driving standards (such as driving on the left side or the right side of the road). Device A then generates a map of the relative positions of the different personal devices in step 710, and transmits that information to the other personal devices in step 712. The other personal devices receive the pings and update their knowledge of the loose mesh network in step 714. Finally, depending on whether in step 716 the process determines that the default for all the devices is that the distracting apps are enabled or disabled, all the apps on the non-driver personal devices are enabled in step 718 or the distracting apps on the driver's personal device are disabled in step 720. Thus, at the end of the exemplary process illustrated in flowchart 700, the driver has been identified, and the distracting apps on the personal device(s) associated with the driver have been disabled, while the other personal devices retain their full functionality.

Figure 8:
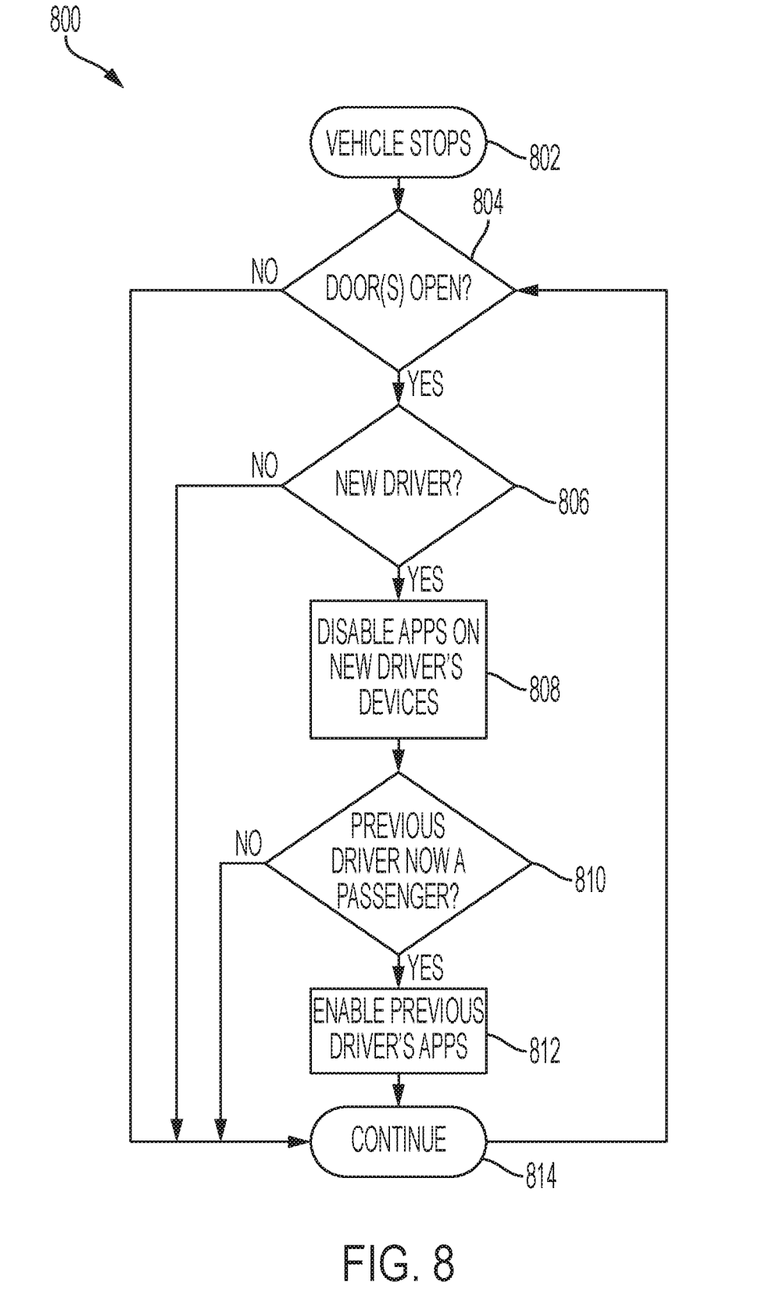
FIG. 8 is an exemplary flowchart showing how a change in drivers may be detected, and the adjustments that may be made as a result, in an embodiment.

FIG. 8 is a flowchart 800 that shows how the system can respond to a change in the driver when a vehicle stops without the engine being turned off. In step 802, one of the personal devices determines that the vehicle has stopped (or is so informed by the vehicle's monitoring units). In step 804, the vehicle's monitoring unit checks to see if any of the doors have been opened and provides that information to the loose mesh network. If no doors have been opened, the process continues in step 814, and returns to step 804 (possibly after a time delay) to again check if any doors have been opened. If the process determines that a door has been opened, in step 806 the process checks to determine if a new driver is now sitting in the driver's seat, for example following the procedures outlined in flowchart 700 illustrated in FIG. 7. The process then disables the distracting apps on the new driver's personal devices in step 808, and checks to determine if the first driver is now a passenger in step 810. If the first driver is now a passenger his or her personal device(s) are then restored to their full functionality in step 812, and the process continues in step 814, where it is returned to step 804.

Figure 9:
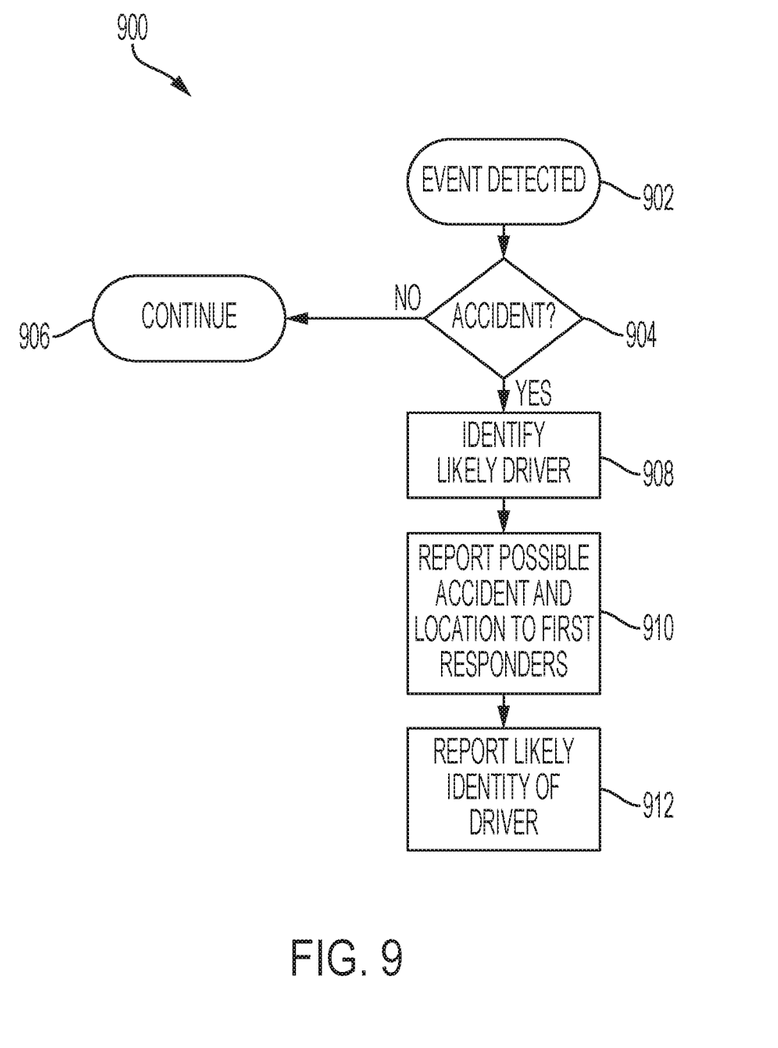
FIG. 9 is an exemplary flowchart showing how the system might respond to a possible accident, in an embodiment.

Finally, in the event of an accident, the system can alert first responders and also provide useful information to the authorities and/or insurance companies. Accidents may be detected by determining that the personal devices have suddenly dramatically changed their position. For example, the personal devices may suddenly all be thrown to the front of the vehicle. In other cases, the devices may be thrown to a side or to the rear of the vehicle, depending upon the particular accident. As shown in flowchart 900 of FIG. 9, once an event has been detected in step 902, the devices on the loose mesh network determine whether an accident may have occurred in step 904. For example, if the vehicle starts moving again, a serious accident is unlikely to have occurred, whereas if the vehicle becomes stationary, a serious accident is possible. If the system determines that an accident did not happen, then the personal devices on the loose mesh network continue operating as before as shown in step 906. However, if a serious accident might have happened, one or more of the personal devices might identify the likely identity of the driver at the time of the accident in step 908, report the possibility of an accident and its location to first responders in step 910, and report the identity of the likely driver to the authorities (and possibly to the vehicle's insurance company) in step 912.

In some cases, the computations required to determine which personal devices are collocated and to identify the driver of the vehicle may be computationally demanding for personal devices. For example, a bus with dozens of passengers would need much more computational power than would a four-passenger sedan. In such cases, the computational burden may be shared among the different personal devices that have been identified as being collocated within the vehicle.

As shown above, embodiments described herein reduce the risk of accidents while retaining the full functionality of passengers' personal devices by disabling distracting apps only on the driver's personal device. Also, in the case of an accident, an embodiment could alert first responders as to the possibility of an accident and its location, and could also identify the driver at the time of the accident for the authorities and/or for insurance companies.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for reducing distractions for a driver of a motor vehicle comprising:
   a first personal device broadcasting pings that include a time stamp identifying the time when the pings were sent;
   a second personal device that receives the pings broadcast by the first personal device;
   the second personal device calculating the distance from the first personal device to the second personal device based at least in part on the time the pings were received compared to the time identified in the time stamp;
   establishing a mesh network between the first personal device and the second personal device;
   determining whether any additional personal devices are collocated with the first personal device and the second personal device;
   adding any additional personal devices, that have been determined to be collocated with the first personal device and the second personal device within the motor vehicle, to the mesh network;
   identifying any personal devices that are associated with the driver of the vehicle; and
   disabling any distracting apps present in the personal devices associated with the driver of the motor vehicle.

2. The method of claim 1, wherein the step of disabling any distracting apps associated with the driver of the motor vehicle does not disable any apps in personal devices that are associated only with passengers in the motor vehicle.

3. The method of claim 1, wherein the step of adding any additional personal devices that have been determined to be collocated with the first personal device and the second personal device comprises determining whether a particular additional personal device is travelling in the same direction and at the same velocity as the first personal device.

4. The method of claim 1, further comprising comparing the signal strengths of the pings received from various personal devices to determine whether they should be included in the mesh network.

5. The method of claim 1, wherein the step of identifying personal devices that are collocated within the vehicle comprises receiving information from the motor vehicle's monitoring units.

6. The method of claim 1, further comprising determining that the motor vehicle has stopped and that the driver's door has been opened, and then identifying personal devices associated with a new driver of the vehicle and disabling any distracting apps from the personal devices associated with the new driver of the vehicle.

7. The method of claim 1, wherein the step of identifying any personal devices that are associated with the driver of the vehicle comprises generating a map of the relative positions of the personal devices on the mesh network.

8. A method for reducing distractions for a driver of a motor vehicle comprising:
 a first personal device broadcasting pings that include time stamps identifying when the pings were sent;
 a second personal device that receives the pings broadcast by the first personal device at specific receiving times, and that calculates its position relative to the first personal device based upon differences between the times identified by the time stamps and the specific receiving times;
 the first personal device determining that the second personal device is collocated with the first personal device within the motor vehicle;
 the first personal device and the second personal device establishing a mesh network between the first personal device and the second personal device;
 the first personal device and the second personal device identifying any additional personal devices that may be collocated within the vehicle;
 identifying which of the personal devices are associated with the driver of the vehicle and disabling any distracting apps on the personal devices associated with the driver of the vehicle.

9. The method of claim 8, further comprising excluding any of the additional personal devices that are determined not to be collocated within the vehicle from the mesh network.

10. The method of claim 9, wherein the step of excluding from the mesh network any of the additional personal devices that are determined not to be collocated within the vehicle based upon at least one of (a) the motions of the additional personal devices relative to the motion of at least one of the first personal device and the second personal device, and (b) the relative signal strengths of the pings received by at least one of the first personal device and the second personal device.

11. The method of claim 8, further comprising detecting that the motor vehicle has stopped moving and that a driver's side door of the motor vehicle has been opened, and determining whether a new driver is now sitting in the driver's seat, and disabling any distracting apps on the new driver's personal device(s).

12. The method of claim 11, further comprising enabling any apps on any personal devices that were previously disabled and are not associated with the new driver.

13. The method of claim 8, further comprising conducting periodic audits of the mesh network to determine whether any previously unidentified personal devices are now operating within the motor vehicle,
 adding those previously unidentified devices to the mesh network,
 determining whether any one of the previously unidentified devices is associated with the driver of the vehicle and disabling any distracting apps operating on that device.

* * * * *